A. STILLMAN.
Evaporating Pan.
No. 4,519.
2 Sheets—Sheet 1.
Patented May 16, 1846.
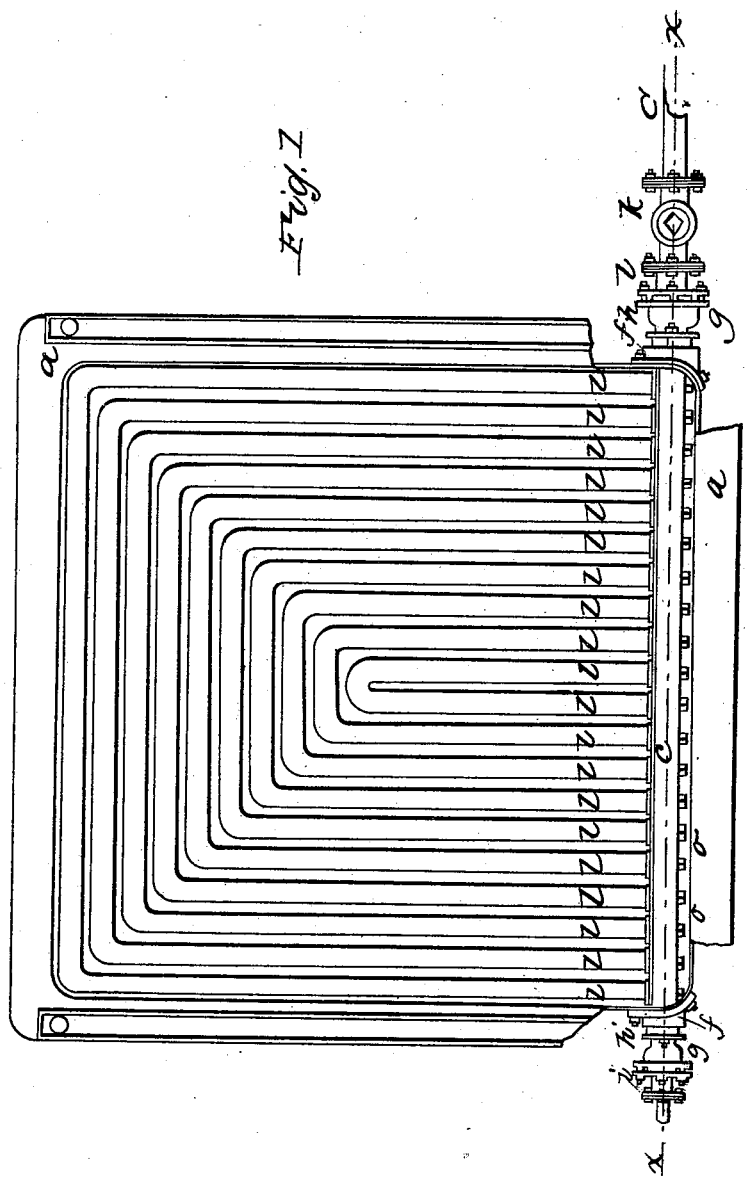

A. STILLMAN.
Evaporating Pan.
No. 4,519.
2 Sheets—Sheet 2.
Patented May 16, 1846.
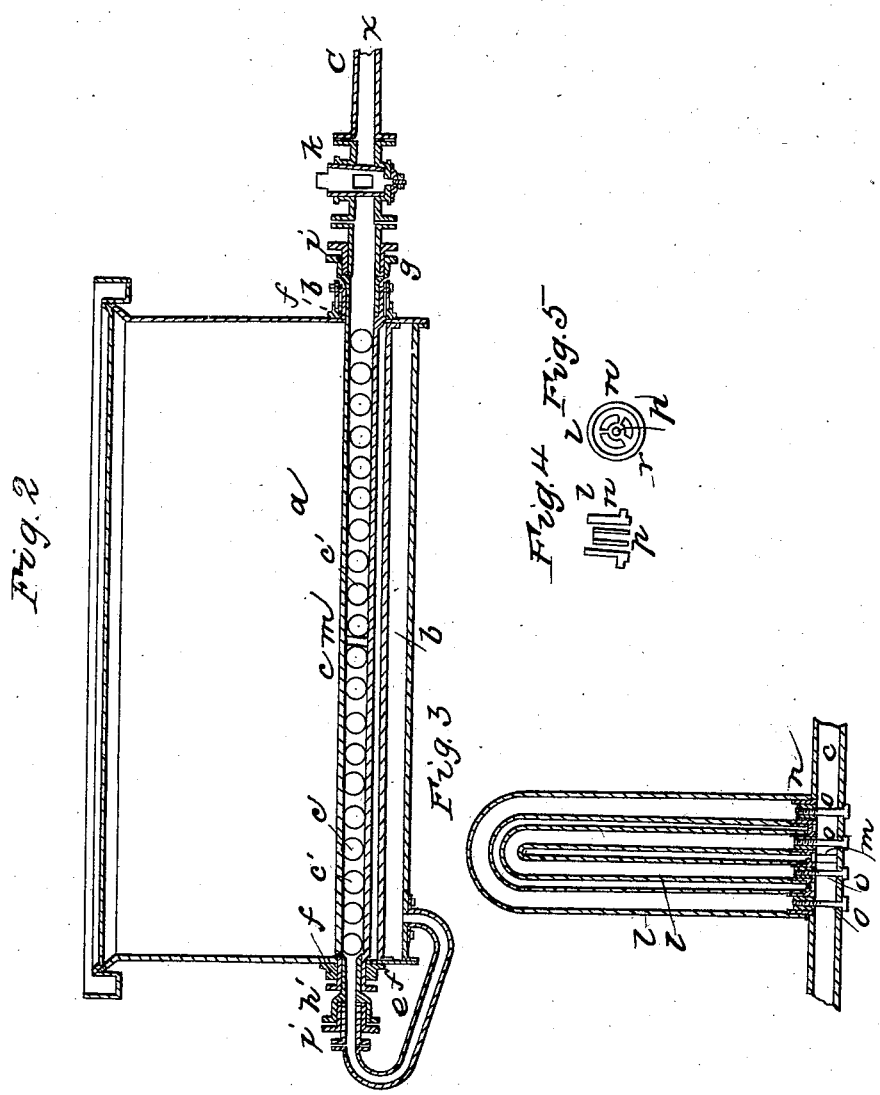

UNITED STATES PATENT OFFICE.

ALFRED STILLMAN, OF NEW YORK, N. Y.

IMPROVEMENT IN SUGAR-PANS.

Specification forming part of Letters Patent No. 4,519, dated May 16, 1846.

*To all whom it may concern:*

Be it known that I, ALFRED STILLMAN, of the city, county, and State of New York, have invented new and useful Improvements in Sugar-Pans for Boiling and Evaporating Saccharine Juices and Sirups; and I do hereby declare that the following is a full, clear, and exact description of the principle or character thereof, which distinguishes my invention from all other things before known, and of the manner of making, constructing, and using the same, reference being had to the accompanying drawings, making part of this specification, in which—

Figure 1 is a top view of the entire apparatus; Fig. 2, a vertical section taken at the line $x\ x$ of Fig. 1; Fig. 3, a horizontal section through the main and branch steam pipes, and Figs. 4 and 5, enlarged horizontal and vertical sections of that portion of the branch pipes which connect with the main pipe.

In the evaporating-pans as heretofore made the main and branch pipes are divided by horizontal partitions, the steam passing into the main pipe below the partition, thence through each of the branch pipes (which are single) below the partitions, and around the end thereof and back over the partitions to the upper division of the main pipe, and thence out, the branch pipes being permanently secured to the main pipes. The objections to this mode are various; but the most important are the great cost of original construction and the difficulties of repair, both of which are in a great measure obviated by my improvements, which consist, first, in dividing the main pipe by a vertical partition in the middle of its length, in combination with bent branch pipes that connect each with the main pipe on each side of the partition, so that the steam that enters one division of the main pipe passes into and through the bent branch pipes to the other divisions before it passes out; secondly, in connecting the branch pipes with the main pipe by a shoulder-and-socket joint, which admits of fitting by turning the end of the branch and boring the face of the main pipe, in combination with the mode of securing them air-tight by means of screws which pass through the main pipe and are tapped into tubes connected with the end of the branch pipes by flanges to admit of the passage of the steam, which mode of adjustment and connection admits of easy adjustment in the original construction, of the easy removal of any of the branch pipes for repairs, cleaning, and of tightening the joints in the event of a leak by simply turning the screw belonging to the pipe that leaks; thirdly, in connecting the main pipe with the induction and eduction pipes by means of double-packed joints to admit of turning up the branch pipes to clean the pipes and the pan when necessary.

In the accompanying drawings, $a$ represents a sugar or evaporating pan with a double bottom to form a chamber, $b$, below for the circulation of steam in the usual manner. The main circulating steam-pipe $c$ is connected with the pan and with the induction ($d$) and eduction ($e$) pipes in such manner as to admit of turning. The ends of the main pipe $c$ are turned and fit in sockets $f f'$ attached to the sides of the pan, and to the ends of the pipe are fitted short tubes $g\ g'$, and the joints made steam-tight by means of stuffing-boxes $h\ h'$, and the short pipes $g\ g'$ are then connected with the induction and eduction pipes by means of the stuffing-boxes $i\ i'$, the induction-pipe being provided with a stop-cock, $k$, in the usual manner, and the eduction-pipe connected with the double bottom of the pan in any desired manner. The face of the main pipe, to which the branch pipes $l$ are secured, is made flat and provided with an equal number of holes $c'$ on each side of the central partition, $m$, into which the ends of the bent branch pipes $l$ are fitted, so that each branch pipe communicates with both divisions of the main pipe. The ends of the branch pipes are turned to fit accurately the holes in the main pipe, and they are also provided with flanges $n$, that fit the face of the main pipe accurately, and they are then secured by screws $o$, that pass through the main pipe and are tapped into tubular nuts $p$ in the ends of the branch pipes and connected with them by wings $r$. If desired, the flanges $n$ and the heads of the screws $o$ may be packed to insure air-tight joints; but these have not been found necessary.

What I claim as my invention, and desire to secure by Letters Patent, is—

1. Dividing the main pipe into two parts by a cross-partition, in combination with the bent branch-tubes that connect each with the two divisions of the main pipe, as described, for the circulation of the steam.

2. Connecting the main pipe with the sides of the pan, and with the induction and eduction pipes by means of the double stuffing-boxes on each end, as described, to admit of the turning of the main pipe, as described.

3. The method of connecting the branch pipes with the main pipe by means of socket-joints, as described, in combination with the mode of securing them by means of screws passing through the main pipe and tapped into tubular nuts in and connected with the ends of the branch pipes by wings, for the purpose and in the manner herein described.

ALFRED STILLMAN.

Witnesses:
HENRY L. HOWLETT,
EDWD. C. STORM.